Feb. 9, 1937. F. E. TUTTLE 2,070,033
MOTION PICTURE APPARATUS
Original Filed Oct. 20, 1931  3 Sheets-Sheet 2

Inventor:
Fordyce E. Tuttle,
By Newton M. Perkins
Rolla N. Carter
Attorney

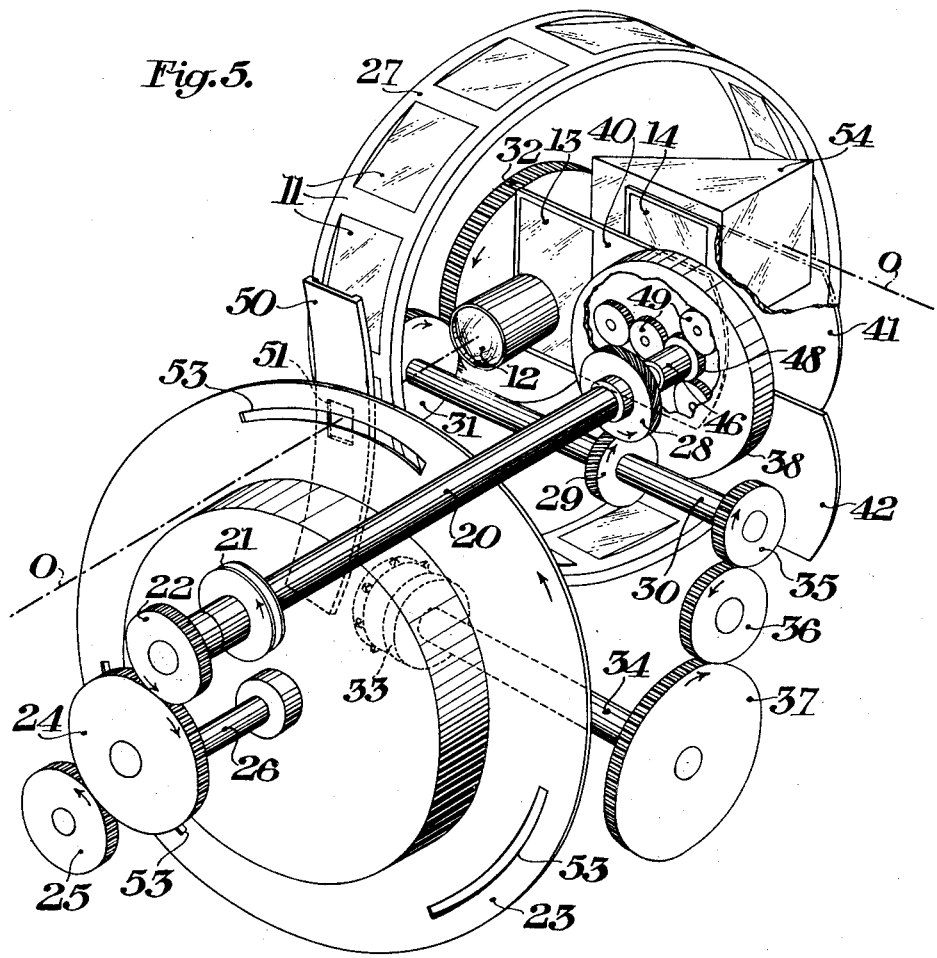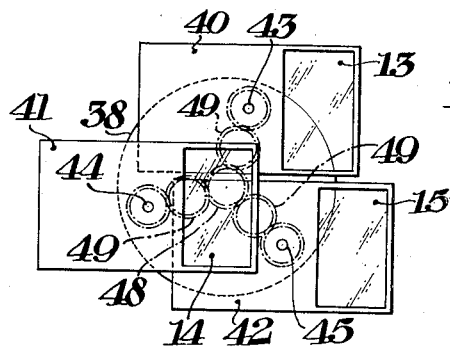

Patented Feb. 9, 1937

2,070,033

UNITED STATES PATENT OFFICE 2,070,033

MOTION PICTURE APPARATUS

Fordyce E. Tuttle, Rochester, N. Y., assignor, by mesne assignments, to Eastman Kodak Company, Jersey City, N. J., a corporation of New Jersey Application October 20, 1931, Serial No. 569,914
Renewed June 7, 1934

12 Claims. (Cl. 88—16.8)

This invention relates to motion picture apparatus either for taking or projecting pictures, and more particularly to apparatus of the type in which film is moved continuously rather than intermittently. In such apparatus the necessity of providing an optical system which will produce a stationary image of a moving object introduces several problems which must be solved to obtain satisfactory results. These problems include the following:

1. It is difficult to have an optical correction, without reciprocating parts, which is linear or nearly linear over large displacement. Also, optical correction over large displacement often introduces aberrations which affect definition of the projected picture or necessitates the cutting down of light.

2. It is difficult to keep the light constant during the changeover period, that is, during the time that a shift is made from projecting wholly from one frame to projecting wholly from the next frame. The usual result of this situation is either a perceptible flicker, because only one change of light occurs per cycle, or the introduction of otherwise needless shutter blades or diaphragms which cut down the optical efficiency.

3. It is hard to make an optical correction device for which the changeover period is a small fraction of the projection period.

It is an object of this invention to provide an optical system which overcomes the above and other difficulties and in which all moving parts follow uniform circular motion.

Another object of this invention is the provision of motion picture apparatus in which the film moves continuously in which there are no reciprocating parts and which is unusually silent in operation.

Other objects and advantages of the invention will appear from the following description when read in connection with the accompanying drawings and its scope will be pointed out in the appended claims.

Referring to the drawings:

Fig. 5 is a perspective view of motion picture projection apparatus embodying my invention;

Fig. 6 is a detail of the mounting of the correcting prisms for circular motion.

In order that my invention may be readily understood, the underlying principles will be explained with reference to Figs. 1 to 4, after which a practical embodiment of the invention incorporating these principles will be described. For ease in understanding, the invention is disclosed as used in a motion picture projector, although it is equally adapted for use in the taking of such pictures. It is to be understood that where simple lenses are shown, corrected objectives would generally be used, and that the angles and dimensions shown are not drawn to scale, the angles in general being exaggerated for the sake of clearness.

Figure 1:
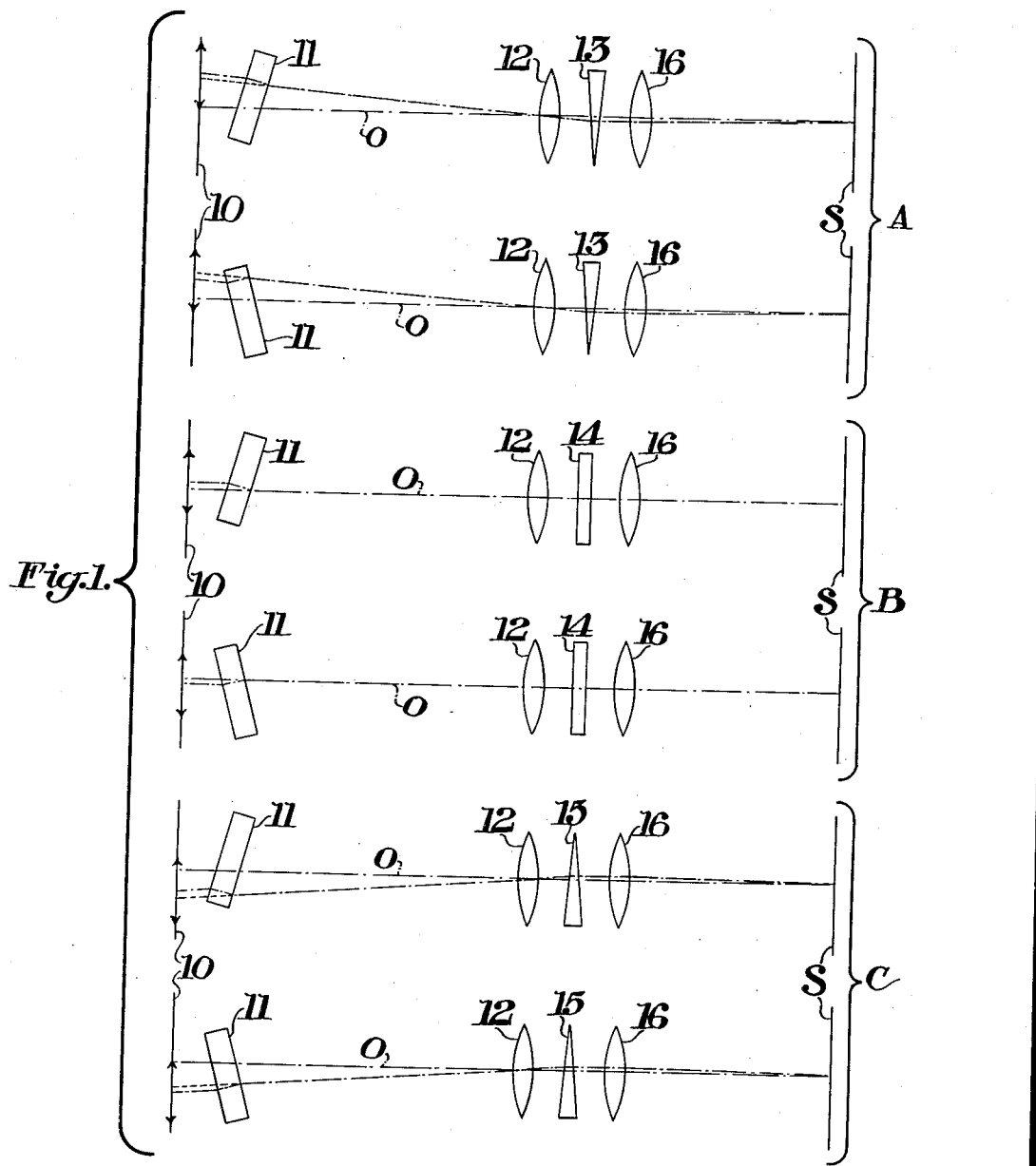
Fig. 1 is a series of six diagrammatic views showing different successive positions of the optical system during the projection of one picture frame.

As diagrammatically shown in Fig. 1, the downward movement of the film 10 is compensated for by a suitable angular movement of a plane parallel refracting member 11 so as to render stationary the virtual image of a picture area, the boundaries of which are indicated by small arrow heads, upon the moving film 10. In the series of views of this figure, the dot and dash lines indicate projection positions assumed by the light path axis relative to the optical axis 0 in the direction of desired displacement, while the film is being advanced one picture area. The dotted lines in the same views indicate the virtual or apparent projection positions assumed by the light path axis relative to the optical axis 0.

For reasons hereinafter to be set forth, the projection of each frame or picture area is divided into three dark periods and three projection periods A, B, and C. During the projection period A the film 10 moves through a distance equal to ⅙ of a frame when all of the periods are of equal length and as shown, the angular movement of the refracting member 11 holds the virtual image of the frame stationary as indicated by the dotted line. In the following dark period the refracting member 11 is returned to its original position and again follows the film 10 while it moves through a distance equal to ⅙ of a frame during the second projection period B. Another dark period follows and the refraction member 11 again follows the film 10 for ⅓ of a frame during the third projection period C. During the dark period after C, the following frame on the film 10 is moved into position to be projected for the first time as in period A, and the cycle is repeated. It is to be noted that during each of the three projection periods A, B, and C, the virtual image of the film 10 remains stationary relative to the objective lens 12, and if the lens 12 were used to image the film on a screen, it would produce three separate images, each of which would be stationary. These three stationary images are of course useless as such and I render them useful by superposing them on the screen in the following manner.

As described above, the film is made to appear stationary by means of a movable refracting member 11 placed on the short optical side of the lens 12, that is on the side toward the film. This produces a deflection of the rays of a given fraction of a frame height which is magnified by the lens system, thus permitting the use of a comparatively thin plate to produce large shifts upon the screen. In order to displace the secondary axis to the optic axis, i. e., superpose the stationary images on the screen, I provide prisms 13, 14, and 15 on the long optical side of the lens 12 which prisms are so positioned that the ray from the film center passes through them at the angle of minimum deviation which keeps distortion of the picture within permissive limits and since the light rays are nearly parallel, they do not interfere with the formation of a point image. From the views in Fig. 1, it is evident that three prisms are required, one for each projection period, to superpose the images. During the projection period A this displacement of the light must be upward to bring the emerging light ray into parallel relation to the optical axis 0, and this is accomplished by the prism 13. Such displacement of the center ray, in effect, is equivalent to projecting with the center ray starting at the optical axis 0 and may be termed a zero correction, that is, the operation is shifted a fixed amount along the path of the film 10. The advantages to be gained from such zero correction will be explained in connection with Fig. 3.

During the projecting period B, the center ray emerging from the lens 12 already lies on the optical axis 0, and obviously no displacement of the ray during this period is necessary. The prism 14 used during this period is therefore merely a plane plate which is used to obtain a mechanical balance and to equalize the amount of light passed by the system during the several periods of projection.

The optical conditions needing correction during projection period C are the same as during period A but in the reverse direction and therefore the prism 15 used here is similar to the prism 13 but inverted.

Figure 4:
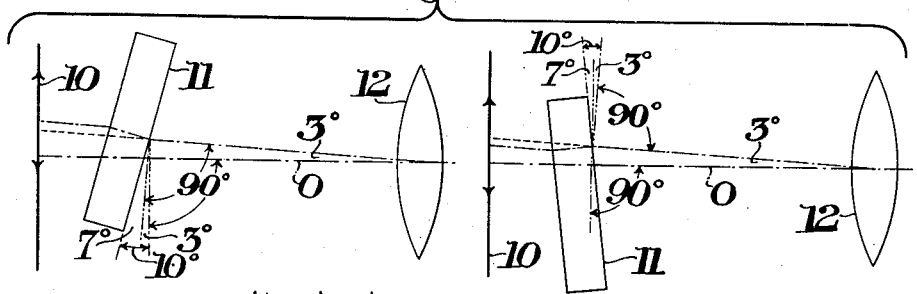
Fig. 4 is a series of two diagrammatic showings for illustrating the limiting angles to which refracting elements may be tilted.

For short screen distances it is desirable to use a collimating lens 16, but for medium or long screen distances, lens 16 is unnecessary and the light emerging from the prisms 13, 14, and 15 may proceed to the screen without interruption. In Figs 1 and 4 the lens 16 is used so as to bring the screen S within the limits of the drawings.

If only one projection period were used per picture frame and an attempt made to compensate optically for the displacement of the film 10 equal to the height of a frame, not only would the flicker arising from the dark period be more pronounced, but grave errors would be introduced which would render the projection image quite unsatisfactory. A graphical representation of this error is shown in Fig. 2 where the actual film displacement and the optical displacement accomplished by its moving optical parts having only uniform circular movement are plotted against time and film displacement as coordinates with the residual error being the difference between the actual film displacement and the optical displacement.

This error, known as the keystone effect, is quite large and in actual practice has been found to degrade the projected image to such an extent as to render it practically unusable. In brief, it may be stated that instead of having a single correction for each frame so large as to introduce an intolerable amount of keystone distortion, I apply the correction separately at three different periods of the showing of a single frame, the distortion thus introduced being at no time great enough to be objectionable.

Figure 2:
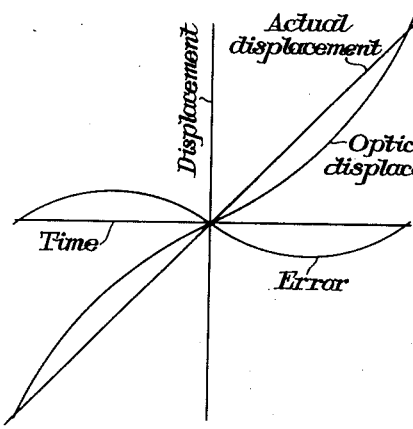
Fig. 2 is a graphical representation of the error introduced when optical compensation of large displacement is attempted by uniform circular motion.
Figure 3:
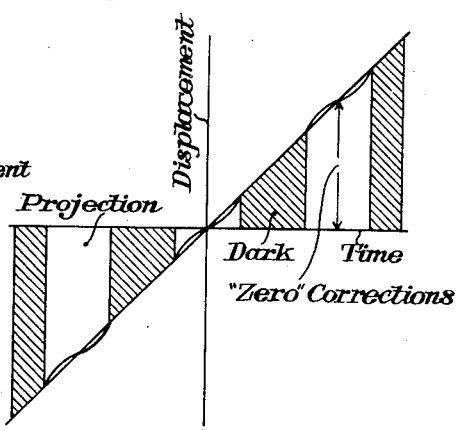
Fig. 3 is a graphical representation of the reduced error obtained by compensating for only small displacements.

Using the same type of optical rectifying means as depicted in Fig. 2, but following a much smaller displacement, it is found that the residual error is much smaller and a satisfactory image can be obtained. However, the optical efficiency is much reduced and to overcome this objection I use more than one projection period for each picture frame and introduce a zero correction into the system during each dark period so that the residual error remains small while the optical efficiency is increased three fold. A graphical representation of a cycle of three projection periods per frame and three dark periods equal in length to the projection period is shown in Fig. 3. In such a cycle the light is interrupted three times during the projection of each frame, thereby eliminating observable flicker and the screen is illuminated half of the time. By following small displacements of the film and introducing the prisms 13, 14, and 15 of Fig. 1, in successive periods to obtain a zero correction of the system for each period, I achieve an optical compensation as indicated in Fig. 3. As here shown, the optical displacement very nearly follows the actual displacement of the film and in practice it is found that the small deviation between the two displacements does not noticeably degrade the projected image.

In determining the amount of displacement which may be safely followed during one period, a great many factors must be taken into consideration, among which are the speed or aperture of the lens and the thickness of the parallel plates. I have found experimentally that with an f.2.0 lens a plate one-half inch thick may be tilted plus or minus 10 degrees from a position perpendicular to the axis of the lens without objectionable movement of or objectionable astigmatic effect in the image of the standard picture frame on 16 mm. film when the frame is centered on the axis of the lens. It is to be understood that this angle is not definitely fixed at 10 degrees since the plates can be rotated 15 degrees from normal without serious imperfections in the image. It being impossible to state definitely when the image ceases to be satisfactory, I prefer to arrange the plates so that their inclination to the axis of the light path passing through them never exceeds 10 degrees.

Referring to Fig. 4 in which there are two views representing the beginning and the end respectively of the first projection period A, at the beginning of the period the axis of the virtual image of the frame enters the center of the lens 12 at an angle of approximately 3 degrees to the optical axis O, and since the virtual image remains stationary throughout the period, this axis lies at the same angle at the end of the period. It is obvious that if the plate 11 is to be rotated plus or minus 10 degrees from a plane perpendicular to the light path axis of the virtual image of the frame, the angle of rotation as measured from the optical axis O will be from plus 13 degrees to minus 7 degrees, as plainly shown in Fig. 4.

During the third projection period C the situation is reversed and as can readily be observed from Fig. 1, the angle of rotation of the plate relative to the axis O will be from plus 7 degrees to minus 13 degrees. The angle of rotation of the plate during the second projection period will be from plus 10 degrees to minus 10 degrees since the virtual image axis and the optical axis O coincide. It is to be understood that the magnitude of the angles mentioned above are for purposes of illustration and that the operation of my invention is not limited to any specific angles.

To comply with the above requirements it is necessary that the plate 11 follow a unique path for each period and in practical apparatus using pure circular motion this means that the plates must be individually mounted in multiples of three when three projection periods per frame are used. The plates are so mounted in the preferred embodiment of my invention now to be described.

For convenience of description my invention is shown in Fig. 5 as comprising a motion picture projector with many of the parts not necessary for an understanding of the present invention omitted. The shaft 20 which serves as the drive shaft for all of the movable parts of the apparatus is adapted to be driven by any suitable means, not shown, through a pulley 21 mounted thereon. A gear 22 secured to shaft 20 is adapted to drive the rotating shutter 23 through the gears 24 and 25 and the shaft 26.

A drum 27 carrying the refracting plates 11 is also driven by the shaft 20 through the helical gears 28 and 29 the shaft 30 and the gears 31 and 32. The gear 32 being secured to the drum 27 in any suitable manner. The shaft 30 is adapted to drive the film sprocket 33 mounted on a shaft 34 through a gear train 35, 36 and 37. Suitably mounted on one end of the shaft 20 and rotatable therewith is a disk 38 upon which is mounted the prisms 13, 14, and 15 carried by plate members 40, 41, and 42 respectively. These plate members 40, 41, and 42 are rigidly secured to three shafts 43, 44, and 45 respectively which are symmetrically spaced on the disk 38 and mounted for free rotation thereon. A bushing 46 in which the shaft 20 rotates is positioned immediately behind the disk 38 and has rigidly secured thereto a gear member 48. Meshing with the gear 48 and rotatably mounted on the disk 38 are three idler gears 49 which are adapted to mesh with the three gears secured to the shafts 43, 44, and 45 respectively. It is apparent from Figs. 5 and 6 that when the disk 38 is rotated and the gear 48 is held stationary with the bushing 46 that the planetary gears secured to the shafts 43, 44, and 45 will revolve about the center of the disk 38 but will not rotate on their own axes, it being understood that the outer gears have the same number of teeth as does the center gear. Since the shafts carrying the plate members 40, 41, and 42 do not rotate, neither do these plates and consequently the prisms 13, 14, and 15 are successively carried through the path of light in such a manner that the angle formed by the refracted light always lies in a single plane which is equivalent to a straight line motion of the prisms.

In order to balance the centrifugal force present, I prefer to form the plate members 40, 41, and 42 carrying the prisms so that the center of gravity of each unit coincides with the center of the shaft upon which it is mounted.

Figure 7:
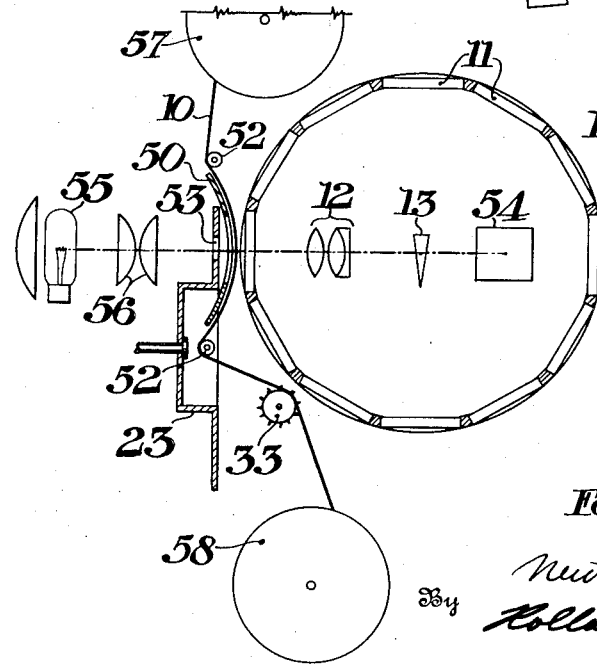
Fig. 7 is a schematic showing in side elevation of the entire light path and film handling mechanism.

Referring to Figs. 5 and 7, the film 10 is trained over a guide plate 50 and past a two frame gate 51 by suitable rollers 52 and is adapted to be uniformly moved past the gate 51 by the sprocket 33 driven as above described. The rotating shutter 23 is positioned immediately behind the gate 51 and is provided with spiral slots 53 having a width equal to the height of the picture frame and having a length corresponding to the length of a projection period. The curvature of the spiral slot 53 and the speed of rotation of the shutter 23 and the sprocket 33 are such that each slot while passing the gate 51 will follow a frame moving past the gate.

The entire apparatus is so related that the passing of the outermost slot across the gate 51 during the first projection period A is synchronized with the movement of the prism 13 into the light path and with the following of the film by a refracting plate 11 so mounted in the drum as to produce upon rotation with the drum an angular movement of the plate 11 from plus 13 degrees to minus 7 degrees relative to the normal of the optical axis O. The second projection period B takes place when the second outermost slot passes the gate 51 at which time the prism 14 is brought into the light path and another plate 11 follows the film. The inner slot of the shutter 23 corresponding to the third projection period C passes the gate in timed relation with the film 10, another plate 11 and the introduction of the prism 14 into the light path.

With the drum 27 arranged as shown the image bearing light emerging from the prisms 13, 14, and 15 would strike the drum and in order to obviate this difficulty I provide a reflecting prism 54 for directing the light from the interior of the drum on to a suitable screen.

In Fig. 7 I have diagrammatically and schematically shown in side elevation the entire light path and film handling essentials of the projector shown in Fig. 5. As here shown, light from a source 55 is collected by the usual condenser lens 56 and concentrated on the film in the gate 51 as uncovered by the slot 53 in the shutter 23. The film 10 may be drawn from a suitable supply reel 57 and wound up on a take-up reel 58 which may be driven in any suitable manner, not shown.

In assembling a projector embodying my invention, all of the moving parts are mechanically interconnected in such manner that upon being operated their movements will be synchronized so as to perform their functions in timed relation as above described and to operate in the following manner: The film 10 is threaded through the apparatus and as in Fig. 7 secured to the take-up reel and due to the teeth on the sprocket 33 two full frames will be positioned in the gate 51 when the outermost slot of the shutter is in position to move across the gate. Upon applying driving power to the pulley 21 the apparatus starts to rotate. When the film is moved $\frac{1}{12}$ of a frame height from the position where the gate is filled with two full frames, the first projection period starts and continues while the film moves downward $\frac{1}{6}$ of a frame, being followed the while by the outermost slot of the shutter and by a plate changing its angular position relative to the optical axis by 20 degrees.

During the entire period the prism 13 is in the light path to introduce a zero correction into the system. The movement of the shutter then shields the gate from the light and during the consequent dark period the film moves 1/6 of a frame, another plate 11 comes into film following position and the zero correction prism 14 is introduced into the light path so that when the second projection period takes place there is a special optical system prepared to handle it according to the then prevailing conditions. The third projection period follows in a similar fashion with a third following plate and the prism 15 in the light path, after which a dark period occurs and the cycle is repeated with the next frame now in position.

Although the members used for displacing the secondary axes to the optic axis have been disclosed as prisms, it is within the contemplation of this invention to utilize any equivalent type of light bending units such as tilted plates or tilted mirrors, the main requirement being to cause the principal rays of the virtual image of the frame being projected to appear to emerge from the projection lens parallel to the optic axis.

The preferred embodiment above described is provided with twelve plates 11 arranged in multiples of three, each plate of a multiple group being adjusted for one period of the three projection periods. However, any number of plates may be used and they may all be mounted uniformly on the drum so long as the greatest angle formed by a plate in the light path with the center axis of the light path is insufficient to produce undesirable astigmatic effects.

While I have illustrated and described my invention as embodied in one form of motion picture projector, I do not intend to be limited to the details shown since various modifications and structural changes may be made without in any way departing from the spirit of my invention, the scope of which is pointed out in the appended claims.

What I claim as new and desire to secure by Letters Patent of the United States is:

1. In a motion picture apparatus the combination with a window, means for continuously moving a film past the window, an optical system including a stationary objective lens having a short optical side and a long optical side, refracting members movable in succession past the lens on its short optical side for holding stationary relative to said lens and in different positions the virtual image of the moving film, a plurality of prism elements movable successively past said lens on its long optical side for shifting the principal ray from the virtual image in each of its positions to parallel relation to the axis of the lens, and means for moving said refracting members and said prism elements in synchronism with said film moving means.

2. Motion picture apparatus comprising means for continuously moving a film carrying a series of picture areas past an exposure window, an objective lens, means for projecting a beam of light through the film at the window to the lens, means for exposing the picture areas singly to the beam of light, means for alternately exposing and shielding a plurality of times each picture area during its movement through the beam of light, movable refracting means for directing the principal ray of the picture area to the center of the lens at a constant inclination thereto during each exposure of the picture area and means for directing the principal ray emerging from the lens in a line parallel to the optical axis of said lens.

3. An optical apparatus comprising a lens having a short optical side and a long optical side, a plurality of plane parallel refracting members movable in succession past the lens on its short optical side, a plurality of individually shaped prisms movable in succession past the lens on its long optical side and means for moving the refracting members and the prisms past the lens in synchronism.

4. Motion picture apparatus including a stationary objective lens having a fixed optic axis, a two frame gate centered on said axis, means for uniformly moving a picture frame past said gate, means for illuminating said picture frame a plurality of times during its movement past said gate, movable refracting means for directing the principal ray of the light transmitted by said frame each time it is illuminated to the center of said lens at a fixed inclination thereto and means for directing the principal ray of the light emerging from said lens in a line parallel to said optic axis.

5. The combination of a film mounted for continuous movement, a lens, a first series of deflectors adapted to variably displace a beam of light during the passage of the beam between the film and the lens and movable at a speed multiple times the speed of movement of the film, whereby said deflectors consecutively follow the same portion of the film through predetermined displacements, a second series of deflectors adapted to move consecutively into and out of the beam of light emerging from the lens for bending the principal ray of the emerging beam of light into parallel relation to the optical axis of said lens and means for moving the film and the two series of deflectors in synchronism.

6. An optical apparatus comprising plane parallel refracting means, means to rotate said refracting means about an axis parallel thereto to effect varying displacements in a single plane of a light beam axis, a series of prism members, means for projecting a light beam to said refracting means, means for effecting linear movement of a film across said light beam in synchronism with the angular movement of the refracting means, optical means for transmitting a light beam after displacement by one of said refracting means to one of said prism members for displacement in said single plane and means for successively moving said prism members into the light beam in synchronism with the movement of said refracting means through the light beam.

7. In motion picture apparatus the combination with a window, means for continuously moving a film past the window, an optical system including plane parallel refracting means movable in succession past the window for holding stationary relative to said window and in different positions the virtual image of the moving film, whereby a plurality of spaced stationary virtual images of the film are successively formed, means for directing the principal ray from the virtual image in each of its positions in a line parallel to the axis of said optical system, and means for moving said refracting means in synchronism with said film moving means.

8. A motion picture apparatus comprising means for feeding film at uniform linear speed, movable optical compensating means, means to effect during movement of the film through a single picture cycle movement of the compensating means through two compensating cycles whereby a point on the moving film is rendered optically conjugate successively with each of two stationary points lying in a common plane and being spaced in the direction of film travel, a lens, a first and a second deflector individual respectively to said spaced points and individually cooperative with said lens to establish optical conjugacy between a predetermined stationary third point and each of the spaced points during conjugacy thereof with the moving film point, and means for effecting relative movement of said deflectors to render them singly cooperative with the lens during successive compensating cycles.

9. In motion picture apparatus the combination with a window, means for continuously moving a film past the window, an optical system including plane parallel refracting means movable in succession past the window for holding stationary relative to said window and in different positions the virtual image of the moving film, whereby a plurality of spaced stationary virtual images of the film are successively formed, means for directing the principal ray from the virtual image in each of its positions in a line parallel to the axis of said optical system, a collimating lens for directing the principal ray from each position of the virtual image through a predetermined point, and means for moving said refracting means in synchronism with said film moving means.

10. In motion picture apparatus in combination with a window, means for continuously moving a film past the window, an optical system including plane parallel refracting means movable in succession past the window for holding stationary relative to said window and in different positions the virtual image of the moving film, whereby a plurality of spaced stationary virtual images of the film are successively formed, means for directing the prinicpal ray from the virtual image in each of its positions through a predetermined stationary point, and means for moving said refracting means in synchronism with said film moving means.

11. In motion picture apparatus, the combination with a window, means for continuously moving film past the window movable optical compensating means, means to effect, during movement of a single film picture past the window, movement of the compensating means through a predetermined number of compensating cycles for holding stationary relative to said window and in different positions the virtual image of said picture, whereby spaced stationary virtual images of the film picture are successively formed, a lens for re-imaging said virtual images, means individually cooperative with said lens for bending the principal ray from a virtual image toward the axis of the optical system comprising said lens and compensating means, and means for operating said ray-bending means in timed relation with the rotation of said compensating means for successively rendering said bending means singly cooperative with said lens.

12. In motion picture apparatus, the combination with a window, means for continuously moving film past the window, movable optical compensating means, means to effect, during movement of a single film picture past the window, movement of the compensating means through a predetermined number of compensating cycles for holding stationary relative to said window and in different positions the virtual image of said picture, whereby spaced stationary virtual images of the film picture are successively formed, a lens for re-imaging said virtual images, deflectors individually cooperative with said lens for bending the principal ray from a virtual image toward the axis of the optical system comprising said lens and compensating means, and means timed with said compensating means for effecting relative movement of said deflectors to render them singly cooperative with said lens.

FORDYCE E. TUTTLE.